(12) United States Patent
Hullender et al.

(10) Patent No.: US 7,546,294 B2
(45) Date of Patent: Jun. 9, 2009

(54) AUTOMATED RELEVANCE TUNING

(75) Inventors: Gregory Hullender, Bellevue, WA (US); Timo Burkard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 11/094,364

(22) Filed: Mar. 31, 2005

(65) Prior Publication Data

US 2006/0224577 A1 Oct. 5, 2006

(51) Int. Cl.
*G06F 17/30* (2006.01)
(52) U.S. Cl. .................................................. 707/6
(58) Field of Classification Search .................. None
See application file for complete search history.

(56) References Cited

U.S. PATENT DOCUMENTS

| | | | | | |
|---|---|---|---|---|---|
| 5,724,571 | A * | 3/1998 | Woods | ............................ | 707/5 |
| 5,991,441 | A * | 11/1999 | Jourjine | ...................... | 382/187 |
| 6,029,195 | A * | 2/2000 | Herz | ............................ | 725/116 |
| 6,233,575 | B1 * | 5/2001 | Agrawal et al. | ................. | 707/6 |
| 6,292,771 | B1 * | 9/2001 | Haug et al. | ..................... | 704/9 |
| 6,424,963 | B1 * | 7/2002 | Ito et al. | .......................... | 707/1 |
| 6,463,430 | B1 * | 10/2002 | Brady et al. | .................... | 707/3 |
| 6,493,711 | B1 * | 12/2002 | Jeffrey | ........................... | 707/5 |
| 6,523,026 | B1 * | 2/2003 | Gillis | ............................. | 707/3 |
| 6,629,097 | B1 * | 9/2003 | Keith | ............................. | 707/5 |
| 2002/0099691 | A1 * | 7/2002 | Lore et al. | ...................... | 707/2 |
| 2003/0225763 | A1 * | 12/2003 | Guilak et al. | ................... | 707/7 |
| 2004/0030723 | A1 * | 2/2004 | Gerstl et al. | .............. | 707/104.1 |
| 2004/0098385 | A1 * | 5/2004 | Mayfield et al. | ................ | 707/3 |
| 2004/0215606 | A1 * | 10/2004 | Cossock | ......................... | 707/3 |
| 2005/0060643 | A1 * | 3/2005 | Glass et al. | .............. | 715/501.1 |

OTHER PUBLICATIONS

Schmidt, et al., "Web Page Aesthetics and Performance: A Survey and an Experimental Study", Proceedings of the 8th Annual International Conference on Industrial Engineering, Nov. 2003.*
6th International Conference on Document Analysis and Recognition (ICDAR 2001), Sep. 10-13, 2001, Seattle, WA, USA. IEEE Computer Society 2001, p. 251-254.

* cited by examiner

*Primary Examiner*—Nirav K Khakhar
(74) *Attorney, Agent, or Firm*—Shook, Hardy & Bacon LLP

(57) ABSTRACT

A system and method for optimizing the performance of a document ranker in a search engine. Weights are assigned to the document features considered by the document ranker. The weights are optimized to produce the highest possible relative ranking for a group of test documents in response to an associated group of search queries.

17 Claims, 6 Drawing Sheets

AUTOMATED RELEVANCE TUNING

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates to a method for optimizing the results produced by a search engine or other pattern recognition engine.

BACKGROUND OF THE INVENTION

Search engines are a commonly used tool for identifying desired documents from large electronic document collections, including the world-wide internet and internal corporate networks. Conventional search methods often involve keyword searching. After receiving a search query containing keywords, the search engine uses a document ranker or a ranking algorithm to evaluate the relevance of documents based on a number of document features. In most conventional search engines, the simple presence of a keyword in the document is only one of many document features considered in determining the ranking or relevance of a document. Other document features can include, for example, the presence of a keyword in a special location in the document (such as the title) or the frequency of occurrence of a keyword. Still other document features considered in determining a document ranking may be unrelated to the keywords in a search query, such as the number of web page links contained in the document, or the frequency with which the document is accessed.

The document features used by a search engine to identify a relevant document do not have to be given equal weight. For example, the presence of a keyword in the title of a document may be a better indicator of relevance than the presence of the same keyword in the body of the document. To reflect this, the presence of a keyword in the title can be given proportionally greater weight.

While the weighting for various document features can be assigned by any convenient method, it is desirable to optimize the weights associated with the document features to further improve search engine performance. Unfortunately, optimization of document feature weights poses significant challenges. A search engine can employ hundreds of document features to evaluate the relevance of a document. To optimize the relevance performance of the search engine, the weight assigned to each document feature needs to be optimized. However, optimized weights for the document features cannot be easily found by a simple sequential optimization of individual weights, as the optimized weight for any one parameter is likely to be correlated with or otherwise depend on the weights of some or all of the other document features. For example, a search engine may use both the presence of a keyword in the title and the presence of a keyword generally in the document as document features. If a keyword is present in the title of a document, it is also likely to appear in the body of the document. Thus, there is a direct correlation between the presence of a keyword in the title and the presence of the same keyword in the body of a document. Additionally, document feature weights may be indirectly correlated for a variety of reasons, such as the use of normalized document feature weights. If a search engine employs normalized document feature weights, an increase in one document feature weight requires a decrease in some or all of the other document feature weights, leading to an indirect correlation of the document features. The large number of directly and indirectly correlated document features makes optimization of the document feature weights expensive from both a time and resource standpoint.

Conventional techniques for determining an optimized set of feature weights for a pattern recognition engine include neural net techniques and other algorithms that attempt to replicate a value function. In these types of techniques, the feature weights are optimized by assigning a target value to one or more documents or patterns. The neural net (or other value function algorithm) then attempts to find a set of feature weights that comes closest replicating all of the target values. At this time, such conventional methods have not been fully effective at producing optimized feature weights.

What is needed is a system and method for optimizing or tuning document feature weights assigned to the document features considered by a search engine. The system and method should allow for tuning of the document feature weights based on a selected set of training documents. The system and method should also allow for tuning of both independent and correlated parameters. Performing an optimization using the system and method should not require excessive time or resources. Additionally, the system and method should allow for simultaneous optimization of multiple parameters. The method should further allow optimization of the weights for relevance parameters in existing search engines.

SUMMARY OF THE INVENTION

In an embodiment, the invention provides a method for performing a document search. The method begins by providing a plurality of documents and one or more associated search queries. One or more feature parameters are then identified for use in a document ranker. Each feature parameter has an initial parameter value. Each of the documents is then ranked relative to a test set of documents at each of a plurality of parameter variations using said document ranker. Note that each parameter variation comprises a parameter value for an associated feature parameter and the initial parameter value for all other feature parameters. Thus, only the parameter value of the associated feature parameter may be different from the initial parameter value. Next, one or more parameter variations are determined, for each of the plurality of documents, that produce a ranking change for a document relative to one or more of the test documents. These ranking changes for each parameter variation are then aggregated by aggregating parameter variations that have the same associated feature (or feature parameter). For each feature parameter, a parameter variation corresponding to a maximum relevance value is identified based on the aggregated ranking changes for each of the plurality of documents. Based on these identified parameter variations, the parameter values of the plurality of parameters are adjusted. This procedure is repeated until convergence is reached. A search query can then be received and matching documents can be identified by ranking the documents using the optimized parameters.

In another embodiment, the invention provides a method for performing a recognizing a pattern. The method begins by providing a plurality of patterns and one or more associated pattern queries. One or more feature parameters are then identified for use in a pattern ranker. Each feature parameter has an initial parameter value. Each of the patterns is then ranked relative to a test set of patterns at each of a plurality of parameter variations using said pattern ranker. Note that each parameter variation comprises a parameter value for an associated feature parameter and the initial parameter value for all other feature parameters. Thus, only the parameter value of the associated feature parameter may be different from the initial parameter value. Next, one or more parameter variations are determined, for each of the plurality of patterns, that produce a ranking change for a pattern relative to one or more of the test patterns. These ranking changes for each parameter variation are then aggregated by aggregating parameter variations that have the same associated feature (or feature parameter). For each feature parameter, a parameter variation corresponding to a maximum relevance value is identified based on the aggregated ranking changes for each of the plurality of patterns. Based on these identified parameter variations, the parameter values of the plurality of parameters are adjusted. This procedure is repeated until convergence is reached. A pattern query can then be received and matching patterns can be identified by ranking the patterns using the optimized parameters.

In still another embodiment, the invention provides a system for performing a document search. The system includes a document feature evaluator for determining one or more document feature values for a document based on a search query. The system also includes a document ranker for calculating a ranking value based on the one or more document feature values, as well as for calculating a feature parameter value associated with each document feature. The system further includes a document ranking aggregator for aggregating document ranking information, identifying variations in feature parameter values corresponding to ranking changes between two or more documents, and determining variations in feature parameter values corresponding to maximum relevance values for a collection of documents. Additionally, the system includes a parameter optimizer for modifying the feature parameter values based on the variations corresponding to maximum relevance values for the collection of documents.

DETAILED DESCRIPTION OF THE EMBODIMENTS

I. Overview

Figure 1:
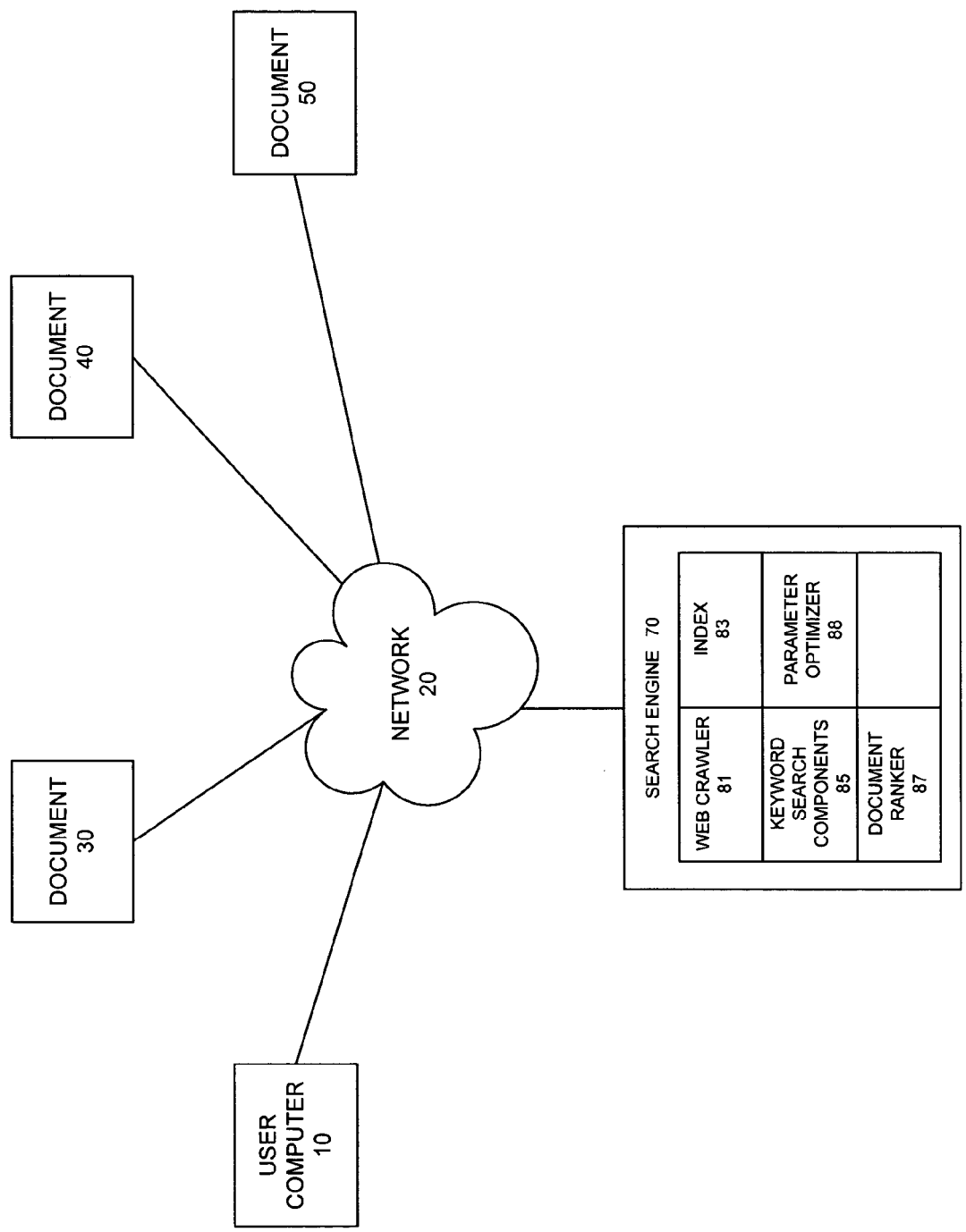
FIG. 1 is a block diagram illustrating an overview of a system in accordance with an embodiment of the invention.

This invention provides a method for improving the identification of relevant documents by a search engine. This is achieved by optimizing or tuning the document feature weights within the search engine. The method allows the weights to be optimized efficiently regardless of any direct or indirect correlations between document features.

In an embodiment, the invention optimizes the weights for document features in a search engine by evaluating the relevance rankings produced by the search engine for a set of test documents. The weights for the document features are not tuned to achieve a specific relevance value for any particular document. Instead, the weights are tuned based on relative rankings for documents contained in a test set of documents. Thus, in this embodiment the particular value assigned to a document is not important so long as the documents have the correct relative rankings or ordering. In other words, the invention optimizes a ranking function rather than a value function.

The method begins by selecting a set of test documents, with each test document being associated with one or more search queries. Each test document is also assigned a separate query value for each associated search query. A higher query value indicates that a document should be ranked highly by a search engine in response to the associated search query. A series of document ranking calculations are then performed. During the document ranking calculations, the weight assigned to each document feature is varied individually over a range of values to determine the impact on document rankings. As the weight assigned to a document feature is varied, the document position of some documents will increase while others will decrease. The impact on document rankings is evaluated based on the change in overall relevance for the documents in the test set. An increase in overall relevance indicates that documents with higher query values are ranked more highly after the document feature weight variation as compared to not having the weight variation. Based on the effects of varying individual document feature weights, the variations causing the largest possible increase in overall relevance for all test documents are identified. These variations leading to a maximum in overall relevance are used to modify the full set of document feature weights toward an optimum value. This is repeated until the weight optimization reaches convergence. In an embodiment, convergence may be defined as having little or no change in the feature weights (or some other calculated value) between iterations. In another embodiment, convergence may be defined as completion of a fixed number of iterations. Note that the parameters or weights are not optimized individually and then combined. Instead, each iteration or update of the document feature weights can potentially change all of the available weights. Once an optimum set of weights have been found, the search engine can be used to perform keyword searches.

In an embodiment, this invention can be used to optimize the weights of the document features for an existing search engine. In another embodiment, the invention can be incorporated as part of the capabilities of a search engine. In still other embodiments, the invention can be used to optimize weights or parameters in other types of pattern recognition engines.

In still another embodiment, the invention provides a system and method for optimizing feature weights for a pattern recognition engine. Searching for documents within a large document collection is an example of using a pattern recognition engine to identify a matching pattern. Other types of pattern recognition engines include handwriting recognition engines and spelling checkers. These other types of pattern recognition engines can also evaluate potential matches based on discrete features. These discrete features can also be weighted to improve or optimize the performance of the pattern recognition engine.

Other types of pattern recognition engines includes handwriting recognition engines and spelling checkers. In an embodiment, the method begins by selecting a set of test patterns, with each test pattern being associated with one or more pattern queries. Each test pattern is also assigned a separate query value for each associated pattern query. A higher query value indicates that a pattern should be ranked highly by a pattern recognition engine in response to the associated pattern query. The weight assigned to each pattern feature is then varied individually over a range of values to determine the impact on pattern rankings. As the weight assigned to a pattern feature is varied, the relative position of some patterns will increase while others will decrease. The impact on pattern rankings is evaluated based on the change in overall relevance for the patterns in the test set. An increase in overall relevance indicates that patterns with higher query values are ranked more highly after the pattern feature weight variation as compared to not having the weight variation. Based on the effects of varying individual pattern feature weights, the variations causing the largest possible increase in overall relevance for all test patterns are identified. These variations leading to a maximum in overall relevance are used to modify the full set of pattern feature weights toward an optimum value. This is repeated until the weight optimization reaches convergence. Once an optimum set of weights have been found, the pattern recognition engine is ready for use.

II. General Operating Environment

FIG. 1 illustrates a system for optimizing search engine performance and performing keyword searches according to an embodiment of the invention. A user computer 10 may be connected over a network 20, such as the Internet, with a search engine 70. The search engine 70 may access multiple web sites 30, 40, and 50 over the network 20. This limited number of web sites is shown for exemplary purposes only. In actual applications the search engine 70 may access large numbers of web sites over the network 20.

Search engine 70 can include a web crawler 81 for traversing the web sites 30, 40, and 50 and an index 83 for indexing the traversed web sites. The search engine 70 can also include a keyword search components 85 for searching the index 83 for results in response to a search query from the user computer 10. Additionally, search engine 70 can include a document ranker 87 for assigning a relevance value to a document based on the document features identified by keyword search components 85. The search engine 70 may also include a parameter optimizer 88 for optimizing the weights or parameters associated with each document feature. Alternatively, parameter optimizer 88 can be part of document ranker 87 or a separate program.

Figure 2:
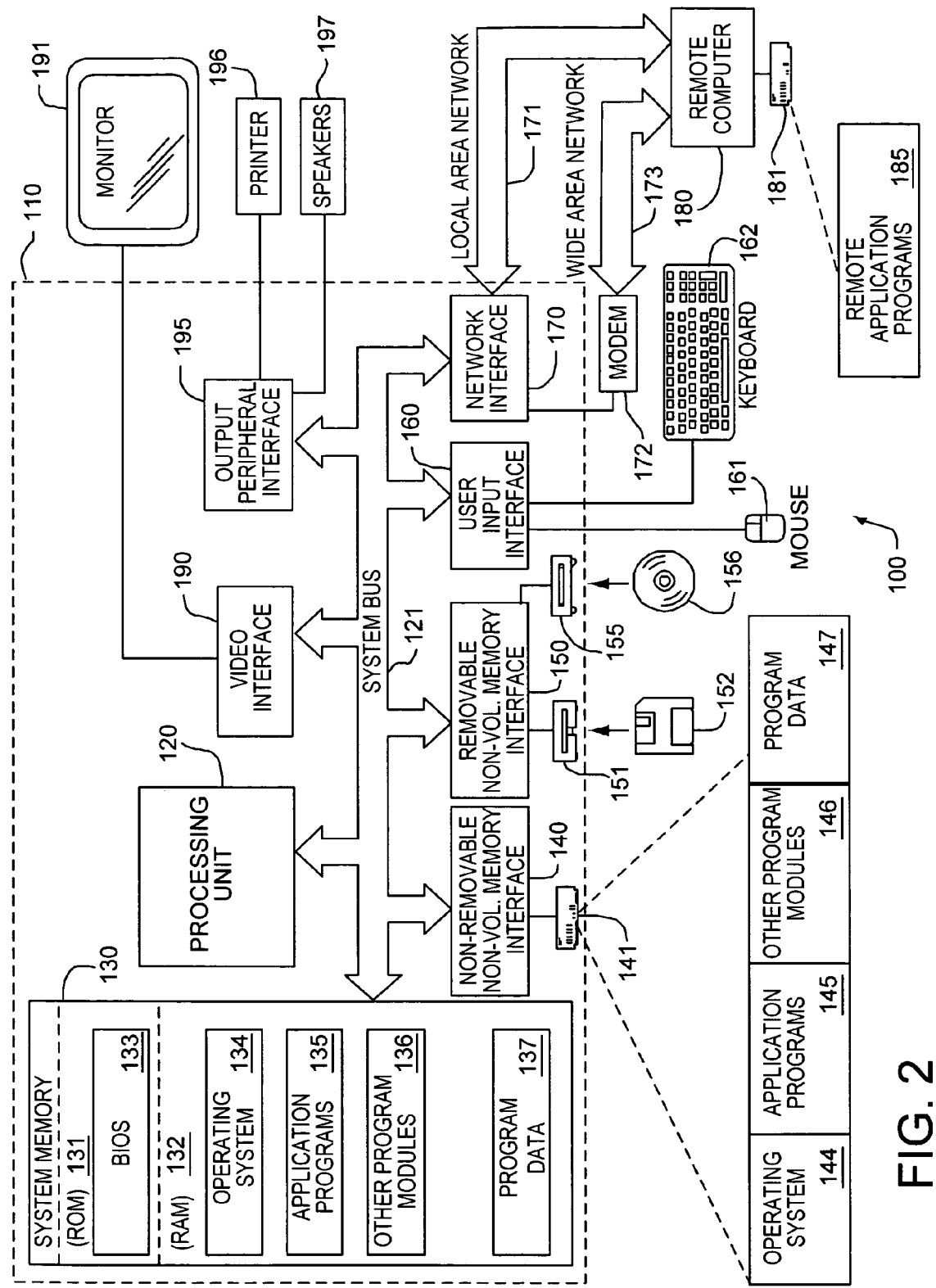
FIG. 2 is block diagram illustrating a computerized environment in which embodiments of the invention may be implemented.

FIG. 2 illustrates an example of a suitable computing system environment 100 for optimizing document feature weights and performing keyword searching according to the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. Although only one additional computer 180 is shown, a local area network (LAN) 171 or wide area network (WAN) 173 may be used to connect multiple additional computers 180 to computer 110. Additional computer 180 may be a personal computer, and typically includes many or all of the elements described above relative to the computer 110, although only a memory storage device 181 has been illustrated in FIG. 2. In a networking environment, computer 110 and additional computers 180 can be closely interconnected to allowing sharing of resources and/or parallel operation. Alternatively, additional computer 180 may be a remote computer with only limited access to resources available on computer 110. In still other embodiments, various additional computers 180 may be present, including both networked computers used for parallel computation, remote computers to receive user input, and other additional computers.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. Selecting an Optimization Goal: Search Query and Document Truth Sets

In an embodiment, a preliminary step for optimizing the document feature weights or parameters for the document ranker of a search engine is the selection of one or more "truth sets" of documents and queries. The truth sets serve as groups of training documents and associated queries for measuring the performance of a search engine in assigning relevance values.

Each truth set is composed of one or more search queries, a group of documents associated with each search query, and a query value assigned to each document based on each associated search query. In an embodiment, each search query in a truth set is associated with each document in the truth set. The query value is not necessarily a ranking assigned to a document by a document ranker. Instead, the query value provides an indication of whether a document should be ranked highly by a search engine. In various embodiments, the query value will be used in determining how to optimize the weights assigned to relevance parameters in the search engine.

The query value can be any convenient number, but in a preferred embodiment the query value is an integer. For example, the query value can be an integer from 0 to 5, an integer from −5 to 5, an integer from 0 to 31, or an integer from 0 to 101. The query value for a document relative to a search query can be assigned based on a variety of criteria. In an embodiment where the query value is an integer, a document in the same language as the search query, but otherwise unrelated to the search query, could be assigned a query value of 1. A document which contains one or more of the keywords in the search query could receive a value of 2. Documents which have still more matching features, such as matching all keywords of a search query, could receive still higher integer values. All other documents would then have a default query value of 0. Note that in some embodiments, such as embodiments involving normalized discounted cumulated gain for aggregating results, it is preferable to have the sum of all query values in the truth set be either non-zero or greater than zero.

In another embodiment, query values can be assigned to documents for an associated search query manually. One or more persons can review each document and the associated search query. The persons then assign a rating to the document. The rating can be a numeric query value, or the rating can be a descriptor such as "Perfect," "Excellent," "Good," "Fair," or "Poor." If a descriptor is used, a query value can then be assigned based on the descriptor, such as assigning a query value of 31 for "Perfect," a query value of 20 for "Excellent," and so on. Note that using a descriptor for the query value allows query values within a truth set to be readily changed.

The documents in each truth set can be selected by any convenient method, including manual selection. Each truth set can contain 10 documents, or 20 documents, or 100 documents, or 1000 documents, or 5000 documents, or any other convenient number of documents. In an embodiment, the documents included in a truth set are selected by performing a search using the search query for the truth set in an existing search engine. The highest ranking documents returned by the search engine are then used to form the truth set, such as the top 20 documents or the top 1000 documents. In an embodiment, the top 20 documents returned by the search engine can be assigned a query value manually. These top 20 documents can have a variety of query values, depending on the numerical value or descriptor assigned by the person or persons. The remaining documents in the truth set can then be assigned a standard or default query value, such as 0. Note that in various embodiments, more than one truth set may have an identical search query. In such embodiments, documents which are present in both truth set should have the same query value in each truth set. Therefore, if a document is assigned a query value other than the default value in one truth set, the document should keep this query value in all other truth sets having the identical search query.

IV. Determining Document Relevance Rankings for a Single Search Query

In an embodiment, the order for displaying documents in response to a search query is selected based on rankings assigned to the documents. The ranking assigned to each document is determined by considering a plurality of document features for each document. The document features considered during ranking can depend on both the keywords included in a search query as well as other features of the document, such as the number of web site links contained in the document. In an embodiment, a document will receive a score for each document feature considered during the ranking process. In such an embodiment, the ranking for the document is a sum over all of the features considered by the document ranker. Mathematically, using a sum of N document feature values to determine the document rank "r" for a document D can be expressed as $$r_1 = \sum_{i=1}^{N} f_i(D_1, Q) \quad (1)$$

where $r_1$ is the ranking for a document $D_1$ and $f_i$ is the value for document feature "i" expressed as a function of the document D and the query Q. Note that the exact details of how $f_i$ is computed are not important.

In another embodiment, weights or parameters can be assigned to the values for each feature. The weights or parameters modify the impact of a given feature value on the overall ranking of the document. For example, if a given feature is assigned a low weight, changes in the value of that feature will have a reduced impact on the overall ranking of a document. In an embodiment, the parameters can be any number. In another embodiment, the parameters can be selected from real numbers with a magnitude between 0 and 1. This embodiment would correspond to using normalized coefficients, so that the sum of the squares of all parameters equals 1. In still another embodiment, the parameters are integers within a range, such as from −1000 to +1000, −100 to +100, or from 0 to 1000. Mathematically, including parameters (or weights) for each document feature considered by the search engine changes the ranking equation to:

$$r_1 = \sum_{i=1}^{N} c_i f_i(D_1, Q) \quad (2)$$

where $c_i$ represents the weight assigned to document feature "i" in the sum.

In other embodiments, the document features and weights can be incorporated into a ranking equation in various ways. For example, the ranking equation could be a quadratic equation with respect to the weight or parameter, such as:

$$r = \sum_{i=1}^{N} c_i^2 f_i(D_1, Q) + c_i g_i(D_1, Q) \quad (3)$$

In still other embodiments, the document feature could appear in various other ways in the ranking equation, such as in the denominator of each element in the ranking equation sum. In general, the ranking equation can be any function of the document features and weights so long as it is possible to solve for the individual feature weights $c_i$. In other words, the ranking equation can have any form so long as it is possible to individually vary each $c_i$, without changing the rest of the parameters, in order to determine changes in document ordering due to variation of only one of the $c_i$. Unless otherwise specified, the examples below will assume that the ranking equation is a sum of elements that are linearly dependent on the document feature weights.

In an embodiment, the initial weights or parameters for each document feature can be selected by hand or assigned randomly. In another embodiment, the parameters can be the default set of parameters employed by an existing conventional search engine. In still another embodiment, the parameters can be a set of parameters generated using this invention with a different group of truth sets. Still other choices for how to assign an initial set of parameters will be apparent to those of skill in the art.

After calculating the ranking for two or more documents, the documents can be ordered accordingly. A document with a higher ranking value is considered to be "ranked above" a document with a lower ranking value. Documents with higher rankings would be displayed earlier on a page of search results in response to the search query.

Figure 3:
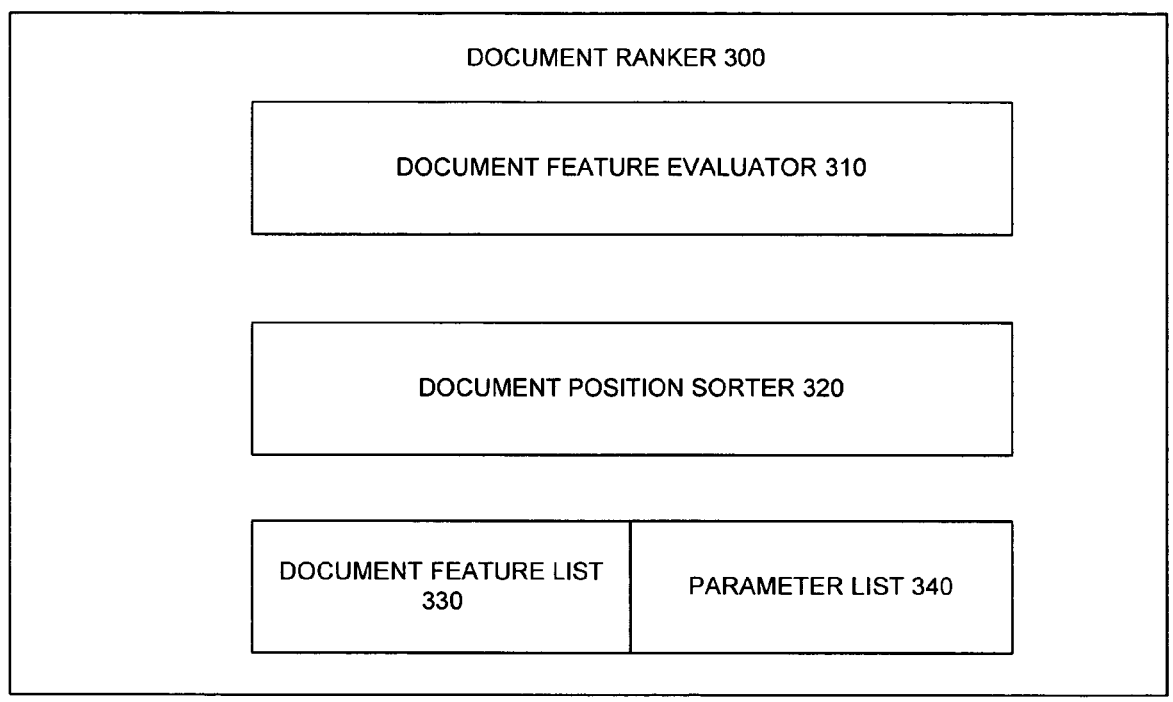
FIG. 3 is a block diagram of a document ranking module in accordance with an embodiment of the invention.

FIG. 3 displays an example of a document ranker according to an embodiment of the invention. In an embodiment, document ranker 300 includes a document feature evaluator 310 and a document position sorter 320. For a given document, document feature evaluator 310 determines the score for each document feature in document feature list 330. Document position sorter 320 takes the scores for each feature, combines the scores with the associated parameter from parameter list 340, and calculates the ranking value for the document. Preferably, document position sorter 320 then sorts the documents, such as from highest ranking value to lowest ranking value.

V. Variation of Document Feature Parameters

The weighted sum of features described above can also be used to determine how the document ranking of a single document changes when the weight or parameter assigned to a single document feature is varied. For convenience, the variation of document feature parameters will be described using an embodiment where the parameters are integers with values between −1000 and +1000. Using only integers for parameters results in quantized variations for the parameters. However, those skilled in the art will recognize that other definitions for the parameter value may be used, leading to other possible parameter variations. For example, if it is desirable to actually have a parameter vary from −3000 to +3000, the array can be scaled so that the first array element (or parameter variation) corresponds to −3000, the second element corresponds to −2997, and so on.

To investigate the impact of changing a single parameter on the positional ordering of a document $D_0$ in a truth set, a selected document feature parameter can be varied from −1000 to 1000 while the remaining parameters are held constant. At each possible parameter value (or parameter variation), the ranking for document $D_0$ and each other document $D_j$ in the truth set is calculated. This allows the position of $D_0$ to be determined for each parameter variation for the selected parameter.

Based on the rankings, the position of $D_0$ can be determined at each parameter value. In an embodiment, the position of $D_0$ for each parameter value can be stored in a document position array for later use. The document position array is an array with an element corresponding to each possible value of a parameter being varied. Preferably, the parameter is varied to have integer values. The elements in the array contain information about the document position. In an embodiment, the actual document position relative to all other documents is stored in an array element. In another embodiment, each array element (or parameter variation) stores a change in document position relative to the previous array element. In such an embodiment, the first element in the array (such as the element corresponding to −1000) contains the number of documents that $D_0$ is ranked above. Each successive element in the array then contains the change in the number of documents that $D_0$ is ranked above.

In another embodiment, the position of $D_0$ is determined by comparing the ranking for $D_0$ with the ranking for each document $D_j$ over the full range of parameters. Rather than computing the actual ranking for each $D_j$, the ranking equation is used to find any crossing points where the ranking or positional order of $D_0$ changes relative to $D_j$. To do this, the ranking equations for $D_0$ and a document $D_j$ are subtracted from each other to find the difference in the ranking value. This produces $$\Delta r = r_0 - r_j = \sum_{i=1}^{N} c_i \Delta f_i; \Delta f_i = f_{0i} - f_{ji} \quad (4)$$

where $c_i$ and $f_{ji}$ are the parameter being varied and the value of the corresponding document feature respectively for each document. Because only one parameter $c_i$ is being varied, the portion of the sum related to $c_i$ can be separated out. The remaining portion of the sum will then be treated as a constant. This produces $$\Delta r = c_i(f_{0x} - f_{jx}) + B = Ac_i + B \quad (5)$$

where B is the remaining portion of the sum over the document features that is unchanged when parameter $c_i$ is varied.

In order to achieve the highest possible ranking for document $D_0$, we want to find values of $c_i$ so that $\Delta r > 0$. To find the root where the ranking value of $D_0$ crosses over the ranking value of $D_j$, we can rearrange equation (4) to express this condition as $$c_i = -\frac{B}{A} \quad (6)$$

When the above equation is satisfied, the document $D_0$ will have the same ranking value as the document $D_j$. Depending on the value of A, the root $c_i = -B/A$ can correspond to either an upper bound or a lower bound. If A is greater than zero, equation (5) will correspond a lower bound for $c_i$, so that parameter variations where $c_i$ is greater than $-B/A$ will place $D_0$ above $D_j$. If A is less than zero, the equation will correspond to an upper bound, so that lower values of $c_i$ will maintain $D_0$ above $D_j$. Of course, if A is equal to zero, changing the value of $c_i$ will not change the relative position of $D_0$ and $D_j$. In other words, A being equal to zero means the document feature $f_i$ associated with parameter $c_i$ cannot be used to distinguish documents $D_0$ and $D_j$ from each other. In this situation, $D_0$ with either be always above or always below $D_j$. Note that the value $-B/A$ may not be an integer. In embodiments where $c_i$ is selected to have only integer values, if $-B/A$ is not an integer value $c_i$ can be rounded to next highest integer value.

Determining the crossover point for $D_0$ with each available document $D_j$ in the test set creates a number of lower and upper bounds at various integer values. This upper and lower bound information can be stored in a document position array. At the lowest value in the document position array (such as −1000), the number of documents that $D_0$ is currently above is entered. This can be determined by adding the number of documents that Do is always above to the number of upper bounds found during the comparison. Each following array element (corresponding to the next integer, such as −999) can then contain the change in the number of documents that $D_0$ is above. For each lower bound corresponding to an integer the array value is increased by one. Similarly, the array value is decreased by one for each upper bound corresponding to an integer. This produces a document position array containing the position of $D_0$ at each parameter value or parameter variation.

In the embodiment described above, the ranking equation used by the document ranker is linearly dependent on the parameter being varied. In another embodiment, the ranking equation can have a quadratic or some other dependence on the parameter being varied. In such an embodiment, the values in the document position array can still be determined as described above. However, each document $D_0$ will potentially have multiple crossover points relative to a given document $D_j$. The crossover points may correspond to roots, poles, or general discontinuities. For example, if a feature value is present in the denominator of the ranking equation, the ranking equation may have one or more poles. As a result, document $D_0$ can have both an upper bound and a lower bound with respect to document $D_j$. More generally, as long as the equation for $\Delta r$ is in a form where roots can be solved for, the places where document $D_0$ and a document $D_j$ change relative position can be identified, allowing the method described above to be used.

In still another embodiment, the document feature parameters for a search engine can be optimized even if the dependence of the ranking equation on the feature parameters is not known. For example, if the form of the ranking equation for a given document feature parameter is not known, a series of three ranking value calculations can be performed where the same document and document query are used, but the document feature parameter is varied. The result of the first two calculations can be used to fit a linear equation. The third calculation is then used as confirmation. If the ranking equation is linearly dependent on the document feature parameter in question, the third ranking value should be predicted the linear equation. If not, all three ranking values can be used to fit a quadratic equation. A fourth ranking value is then calculated to determine if the quadratic equation is correct. Similarly, other expected formats for ranking equation dependence can be tried for each parameter where the dependence is unknown.

In an alternative embodiment, the value of $c_i$ can be allowed to take on any real value. In this embodiment, the crossover point is calculated as above. However, instead of creating a document position array of discrete $c_i$ values, the actual crossover value of $c_i$ for each document comparison is recorded. This still results in a series of upper an lower bounds, but the likelihood of two documents $D_j$ producing the same crossover point for ranking relative to a document $D_0$ is low. As a result, if $c_i$ is allowed to take on any real number value, the amount of data to be stored may increase greatly and additional computational time may be required. In this embodiment, only one crossover point is allowed.

VI. Combining Ranking Results—Normalized Discounted Cumulated Gain

The above methods describe how to determine the change in display position for a single document $D_0$ in a truth set when a single parameter $c_i$ is varied. Using the above methods, a document position array can be produced to determine the possible positions of each document in each truth set for all possible parameter variations over all parameters. In order to optimize the parameters, however, the results of the document positions must be combined so that the maximum increase in document relevance can be identified. In various embodiments, this is accomplished by using the query value associated with each document to determine a discounted cumulated gain for each parameter being varied. However, other metrics used in information retrieval, such as MAP, could be used in place of discounted cumulated gain.

The discounted cumulated gain calculation is based on the query value for a document and the display position of the document under a given variation of the document feature parameters. The discounted cumulated gain is a sum for each document at each possible parameter value. The contribution of each document to the normalized discounted cumulated gain can be expressed as $$DCG = V/\log_2(n+1) \quad (7)$$

where "n" is the display position of the document in response to the search query and V is the query value of the document.

To determine the discounted cumulated gain, a parameter gain array or histogram is constructed for each parameter being varied. Preferably, each parameter gain array should have the same number of elements as the document position arrays. The information in the document position arrays can then be used to determine the discounted cumulated gain at each parameter variation. Each parameter has an associated group of document position arrays containing changes in document position based on variations of the parameter. For each of these document position arrays, the discounted cumulated gain value for the document can be determined for each parameter variation. These discounted cumulated gain values are added together and stored in the corresponding element in the parameter gain array. After performing this sum over all documents, the values in the resulting parameter gain array can then be reviewed to find the highest value. The array element corresponding to the highest value represents the weight or parameter value producing the highest overall document relevance.

Note that the individual discounted cumulated gain values for each document depends only on the query value and the position of a document. If two documents have the same query value, exchanging the position of those documents will have no impact on the the discounted cumulated gain value. In particular, if the majority of documents in a truth set have a default query value of zero, changes in document positions involving only these zero query value documents will not change the discounted cumulated gain. In an embodiment, this can be used to increase the efficiency of the parameter variation procedure, as only the position changes of documents with a query value of greater than zero need to be considered. In another embodiment, a document position cutoff can be used so that documents with a position lower than a threshold value, such as 10 or 20 or 100, are excluded from the sum.

In an embodiment, only one document position array and parameter gain array are needed for each feature parameter being varied. In such an embodiment, the elements of both arrays are initially set to be zero. When a parameter is varied to determine the change in ranking for a document, the document positions are stored in the document position array as described above. The document position information is then used to add the appropriate values to the parameter gain array. To determine the change in ranking for a second document, the document position array can be overwritten with the new document position values. These document position values are used to once again add the appropriate values to the parameter gain array.

VII. Optimizing the Parameters by Determining the Maximum Relevance Increase

Based on the above, the discounted cumulated gain for the variation of each parameter can be determined. In an embodiment, the discounted cumulated gain values are stored in a parameter gain array for each parameter. The values stored in the parameter gain array are then analyzed in a single, linear pass of the parameter gain array to identify the individual parameter variation producing the highest increase in document display position (document relevance) over all documents considered in the test set. Additionally, the maximum discounted cumulated gains for each parameter can also be used to determine a proposed change in each parameter value. This allows the optimization to move each parameter toward the optimum value during each iteration.

In an embodiment, the highest discounted cumulated gain value $P_i$ stored in the parameter gain array associated with each $c_i$ is identified. These highest values $P_i$ correspond to the largest changes or increases $\Delta P_i$ in the discounted cumulated gain relative to the initial set of parameters. The $P_i$ values are also compared to determine the single largest value $P_z$, which corresponds to the largest change $\Delta P_z$. The largest change $\Delta P_z$ is then used to normalize the $\Delta P_i$ values for all other parameters, which produces a normalization factor $\Delta P_i/\Delta P_z$ for each parameter. Next, the change in each parameter ($\Delta c_i$) required to achieve each $P_i$ value is determined. The normalization factor $\Delta P_i/\Delta P_z$ for each parameter is then multiplied by $\Delta c_i$ to provide an initial proposed parameter change for each parameter. Preferably, the proposed parameter change for each parameter is then multiplied by a scaling factor G to aid convergence on a final set of parameters. Finally, each parameter is modified by the scaled parameter change. Mathematically, each new parameter $c_i^{new}$ can be determined using the formula:

$$c_i^{new} = c_i + \Delta c_i \frac{\Delta P_i}{\Delta P_z} G \quad (8)$$

This method for optimizing the parameters will now be explained in more detail. First, the highest value $P_i$ in each parameter gain array is identified. In an embodiment involving parameter gain arrays with values from $-1000$ to $+1000$, $P_i$ is determined by comparing the parameter gain value in each element of the parameter gain array with all other array elements. The highest value $P_i$ from each parameter gain array is then compared with all other highest values to identify the parameter $c_z$ whose variation produced the largest discounted cumulated gain value ($P_z$). The difference between each highest value $P_i$ and the initial discounted cumulated gain value $P_0$ is calculated to find the change or increase in the discounted cumulated gain $\Delta P_i$ that corresponds to a given change in a parameter $c_i$. After determining all of the $\Delta P_i$, the $\Delta P_i$ from each parameter gain array is divided by $\Delta P_z$ (the largest change in discounted cumulated gain) to produce a normalization factor $\Delta P_i/\Delta P_z$. Note that $\Delta P_i/\Delta P_z$ will have a value of 1 when i=z, while for the remaining parameters $\Delta P_i/\Delta P_z$ values will be less than 1.

For each parameter, the difference between the current value of $c_i$ and the value of $c_i$ that corresponds to the array element containing $P_i$ is also computed to yield $\Delta c_i$. The $\Delta c_i$ is then multiplied by $\Delta P_i/\Delta P_z$ to produce a proposed parameter change for each parameter. Note that using $\Delta P_i/\Delta P_z$ as a coefficient allows parameters with higher values $P_i$ (corresponding to larger increases in relevance) to change more than parameters which produced low $P_i$ values. At this point, the proposed parameter change $(\Delta P_i/\Delta P_z*\Delta c_i)$ could be added to each parameter $c_i$ to produce a new set of parameters $c_i^{new}$. In another embodiment, the proposed parameter change is multiplied by a scaling factor G before creating the new set of parameters $c_i^{new}$. Preferably, scaling factor G is a number less than one, such as 0.01, 0.02, 0.05, or 0.1. The scaled proposed parameter change $(G*\Delta P_i/\Delta P_z*\Delta c_i)$ is then added to each parameter $c_i$ to produce the new set of parameters $c_i^{new}$. This produces equation (8) as shown above. Including the scaling factor reduces the amount of change between successive iterations of the optimization. Reducing the size of the parameter change in each iteration should reduce the chance of problems reaching convergence.

In another embodiment, rather than arbitrarily selecting a scaling factor G, the scaling factor can be selected to provide the largest possible increase in document relevance. For example, a scaling array can be constructed with elements corresponding to G values of 0 to 1 in steps of 0.01. A change in relevance (discounted cumulated gain) for the test set of documents is then calculated using equation (8) above, with G taking on each value from 0 to 1 in 0.01 increments. The value of G that produces the highest discounted cumulated gain value over all documents is selected and used to create the $c_i^{new}$ for the next iteration. Note that although only one scaling factor G needs to be determined, this procedure is otherwise analogous to the procedure for finding the value $c_i$ that produces the highest discounted cumulated gain as described above.

Alternatively, for some forms of $c_i^{new}$, it may be possible to simply solve for G like any other coefficient to determine the best value for G. For example, when $c_i^{new}$ corresponds to equation (8) above, substituting $c_i^{new}$ into the ranking equation produces $$r_1^{new} = \sum_{i=1}^{N} c_i^{new} f_i(D_1, Q)$$

So $$\Delta r^{new} = r_0^{new} - r_j^{new}$$

$$= \sum_{i=1}^{N} c_i^{new} f_i(D_0, Q) - \sum_{i=1}^{N} c_i^{new} f_i(D_j, Q)$$

$$= \sum_{i=1}^{N} c_i^{new} [f_i(D_0, Q) - f_i(D_j, Q)]$$

Because $c_i^{new} = c_i + \Delta c_i \frac{\Delta P_i}{\Delta P_z} G$ $$\Delta r^{new} = \sum_{i=1}^{N} c_i^{new} [f_i(D_0, Q) - f_i(D_j, Q)]$$

$$= \sum_{i=1}^{N} \left(c_i + \Delta c_i \frac{\Delta P_i}{\Delta P_z} G\right)[f_i(D_0, Q) - f_i(D_j, Q)]$$

$$= G \sum_{i=1}^{N} c_i \frac{\Delta P_i}{\Delta P_z}[f_i(D_0, Q) - f_i(D_j, Q)] + \sum_{i=1}^{N} c_i[f_i(D_0, Q) - f_i(D_j, Q)]$$

$$= GA + B$$

Where $$A = \sum_{i=1}^{N} \Delta c_i \frac{\Delta P_i}{\Delta P_z}[f_i(D_0, Q) - f_i(D_j, Q)]$$

$$B = \sum_{i=1}^{N} c_i[f_i(D_0, Q) - f_i(D_j, Q)]$$

As before, for a document $D_0$ to be ranked above a document $D_j$, we require $$\Delta r^{new} > 0$$

So this requires either $$G > -\frac{B}{A}; A > 0$$

$$G < -\frac{B}{A}; A < 0$$

As shown, the inequality to use depends on the value of A. This is effectively the same procedure used to determine the feature weights which lead to changes in document ordering as described above. The value of G for each document that satisfies the above condition can be determined, and the corresponding upper and lower bounds produced can be used to identify the value of G leading to the highest discounted cumulated gain. This value of G is then selected as the scaling parameter. Note that When G is separable, solving explicitly for G can provide a faster way for determining the best value for G.

Note that the scaled proposed parameter change $(G*\Delta P_i/\Delta P_z*\Delta c_i)$ may not be an integer. This can be handled in various ways. In an embodiment, the scaled proposed parameter change is rounded down to the next smallest integer. In another embodiment, the scaled proposed parameter change is rounded to the closest integer. In still another embodiment, the scaled proposed parameter change is not rounded. Instead, it is added to the current parameters to produce a $c_i^{new}$ that includes non-integer values. During the next iteration, this will require the calculation of one additional data point for each document position array, as the current value of $c_i$ will not correspond to any of the integer values (such as integers from −1000 to +1000).

Once the parameters $c_i^{new}$ are created, the entire process of computing discounted cumulated gain values for single parameter variations is repeated. This is continued until the calculation produces a set of parameters $c_i^{new}$ that is identical to the old set of parameters $c_i$. Alternatively, in embodiments where the scaling factor G is also optimized, convergence occurs when the highest value in the scaling array occurs for either G equal to 0 or when G is arbitrarily close to 0, such as less than 0.02. In still another embodiment, convergence can occur based on performing a fixed or maximum number of iterations, such as 20 iterations.

Figure 4:
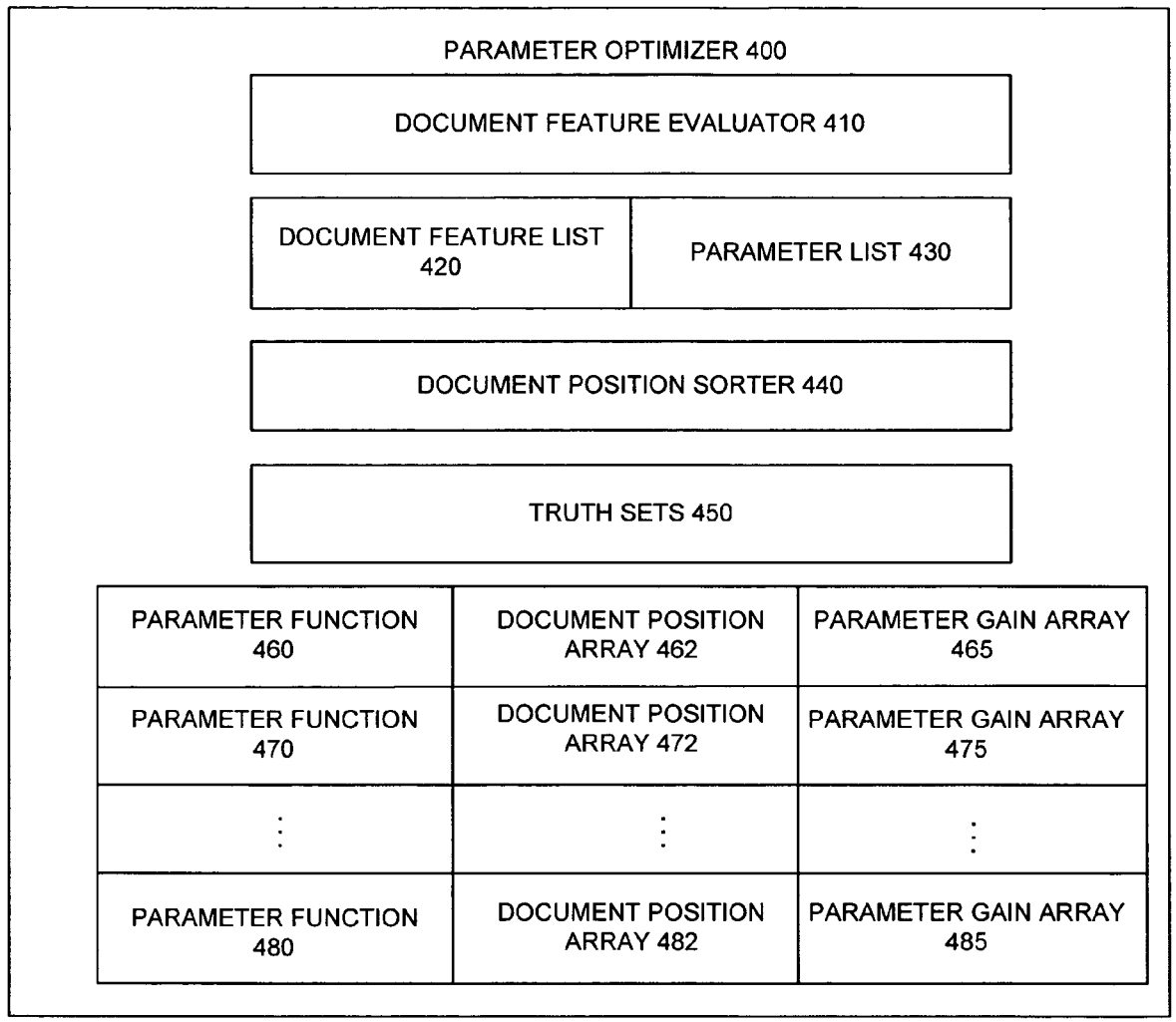
FIG. 4 is a block diagram of a parameter optimizing module in accordance with an embodiment of the invention.

FIG. 4 provides an example of a parameter optimizer according to an embodiment of the invention. In an embodiment, parameter optimizer 400 includes a document feature evaluator 410. Alternatively, the parameter optimizer can use document feature scores provided by a document ranker. Parameter optimizer 400 can also include a document feature list 420, a parameter list 430, and a document position sorter 440. In this embodiment, the document position sorter can both sort groups of documents based on ranking values as well as determine crossover points (roots corresponding to upper and lower bounds) when comparing just two documents. Alternatively, these elements can also be provided by an associated document ranker.

Parameter optimizer 400 can further include one or more truth sets 450. The truth sets contain the queries, test documents, and associated query values that will be used to in assessing whether a parameter set provides the overall highest relevance for the most documents. In an embodiment, parameter optimizer 400 also stores the equation describing the dependence of the ranking equation on each parameter in parameter functions such as parameter functions 460, 470, and 480. Additionally, parameter optimizer 400 includes document position arrays such as document position arrays 462, 472, and 482, as well as parameter gain arrays such as parameter gain arrays 465, 475, and 485.

Figure 5:
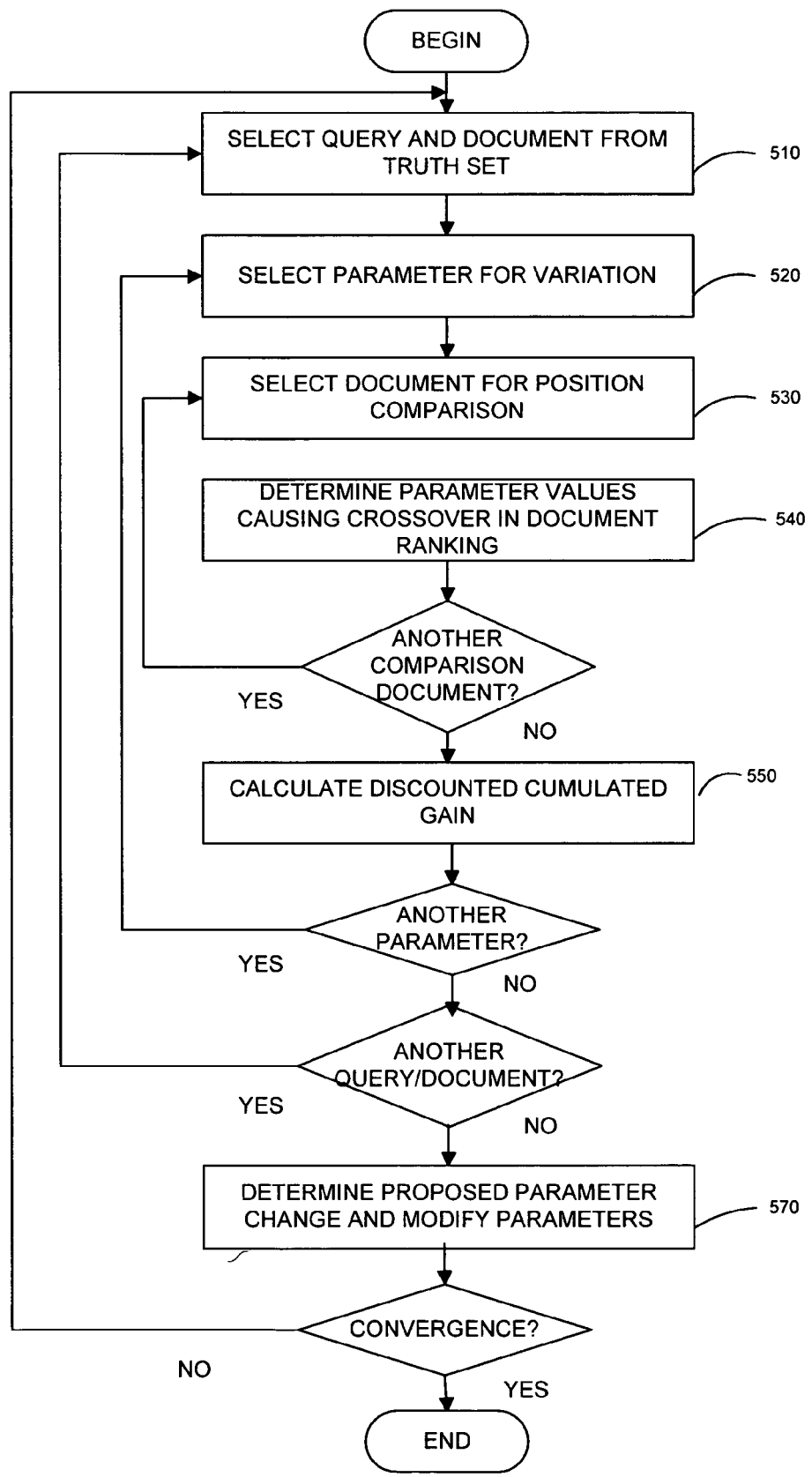
FIG. 5 is a flow chart illustrating a method for optimizing document feature parameters according to an embodiment of the invention.
Figure 6:
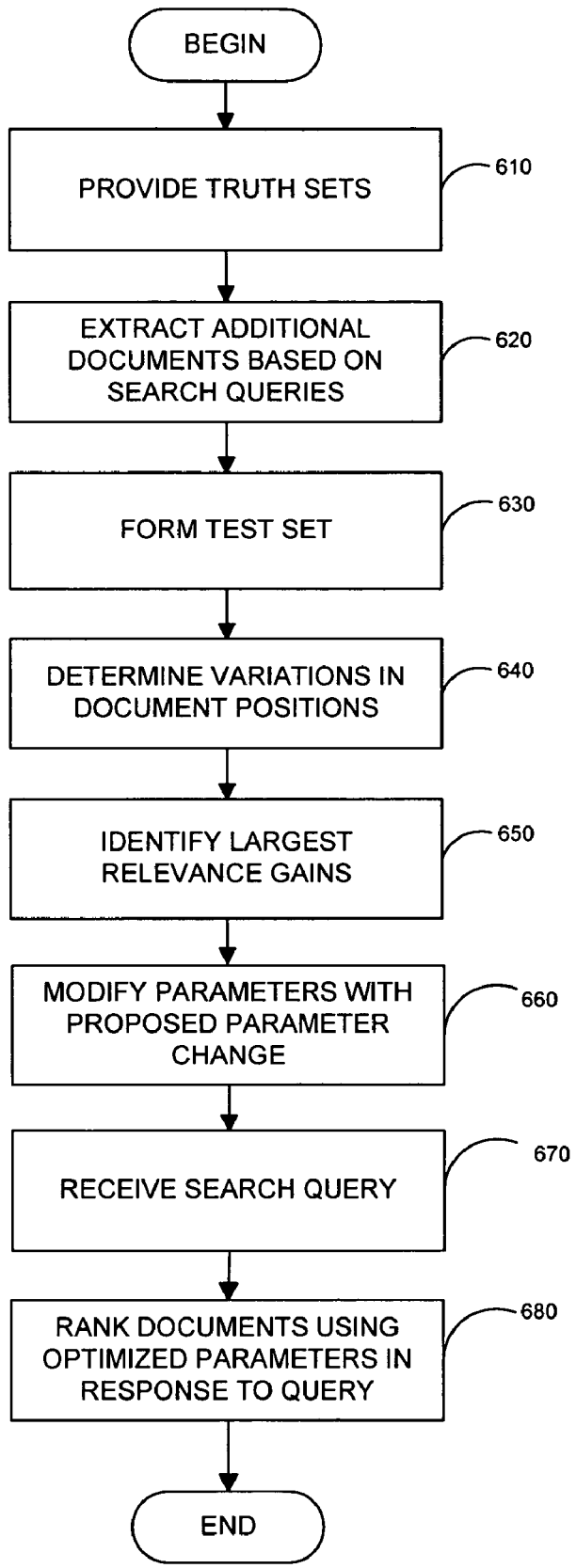
FIG. 6 is a flow chart illustrating a method for performing a document search using optimized document feature parameters according to an embodiment of the invention.

FIG. 5 depicts a flow chart of how to optimize the document feature values of a document ranker according to an embodiment of the invention. In an embodiment, a search query and a first document are selected 510 from a truth set. A parameter is selected 520 for variation. A second document is then selected 530 so that the relative position of the first and second documents can be determined 540 for all values of the parameter. This process is repeated for all documents in the test set in order to construct document position arrays. Based on the document position arrays, the discounted cumulated gain can be calculated 550 for all variations of the parameter over the entire test set of documents. This process is repeated for all parameters in order to construct parameter gain arrays for each parameter. Once all of the parameter gain arrays have been constructed, the highest discounted cumulated gain for each parameter is identified and the proposed parameter change is determined 570. In this embodiment, identifying the best scaling factor is included within determining the proposed parameter change 570. If the proposed parameter change is larger than the convergence criteria, another iteration of the process is performed.

VI. Optimizations Involving Discontinuous Ranking Equations

In an embodiment, this invention can be used to optimize the document feature weights or parameters for an existing search engine. Depending on the search engine, one or more of the following adaptations may be required to perform a parameter optimization.

The document ranker of an existing search engine can be any arbitrary polynomial. For example, some forms of ranking equations include document feature values in the denominator. Because document feature values can vary depending on the characteristics of an individual document, a ranking equation with one or more document feature values in the denominator could potentially have a denominator value of zero for some documents. This creates a pole in the ranking equation which corresponds to a discontinuity. At a pole, the document rank would be undefined. To account for this, a document ranker w If document feature weights are incorporated into the denominator of the ranking equation, variation of a document feature weight could cause the denominator to have a value of zero. This creates a pole for the equation which corresponds to a discontinuity. For example, if $$r = \frac{a}{b+f} + g,$$

then $$\Delta r = \frac{a}{b+f_2} - \frac{a}{b+f_1} + \Delta g,$$

which will have poles for any b equal to $-f_1$ or $-f_2$. When the form of a ranking equation leads to a discontinuity, the document ranker will typically have two ranking equations available, with one ranking equation being used on each side of the discontinuity. For example, if f in the above equation is always greater than zero, then the document ranker can use a different equation can simply be assigned to handle f<0.

In an embodiment where a ranking equation contains a discontinuity, changing the weight for a document feature can cause the value of the ranking equation to approach the discontinuity. In such an embodiment, it is preferable to vary the feature weights discretely. Both ranking equations provided by the document ranker can then be used to evaluate changes in document position, with the appropriate equation from the document ranker being used on each side of the discontinuity. The values of the document feature weight corresponding to the pole should be identified and not used during the current iteration of the parameter optimization. The pole can be then avoided by treating the parameter value on each side of the discontinuity as if it were the end of the parameter range (either the maximum or minimum value, as appropriate). Although the above example includes the presence of only one pole in the ranking equation, those of skill in the art will recognize that the above procedure could be generalized to handle two or more poles in the ranking equation.

VII. Other Default Query Values

The examples above use a default query value of zero for most documents, but other default query values can be selected. Additionally, the majority of documents in a truth set can have a query value different from the default. For example, it may be desirable to have a default query value of zero, but to assign a query value of 1 to any document matching the language of the search query (such as English). In such an embodiment, the majority of documents are likely to have a query value of 1 rather than the default value of 0.

The methods of this invention require can be readily adapted to embodiments where the majority of query values are different from 0. Regardless of the query value for the majority of the documents, a change in the relative position of two documents having the same query value does not lead to a change in the total overall relevance values produced during a search. Therefore, in an embodiment where a majority of documents have the same query value, the speed of the method can be improved by only evaluating documents with a query value different from the majority. However, this embodiment is desirable only for speed of performance, as the method will produce the same results if all documents are evaluated.

VIII. Exemplary Embodiment—Parallel Parameter Optimization

As an example of implementing the system and method of this invention, a document feature parameter optimization can be performed using multiple processors. In this type of embodiment, using multiple processors permits easy access to larger amount of data storage. Additionally, the overall speed of optimization can be improved. In this example, 500 machines are used to perform the parameter optimization.

To begin the optimization, a test set of documents is formed. Part of the test set of documents is based on providing 610 a plurality of truth sets, which are composed of a search query, one or more documents, and a query value for each document in association with the search query. In this example, each truth set initially contains 10 documents with corresponding query values. A total of 30,000 truth sets are provided, each containing a search query, 10 documents, and 10 corresponding query values.

The test set of documents is supplemented by using an existing search engine to search and extract documents 620 from a large document set (such as the Internet) using all search queries found in the truth sets. Large document sets are typically keyword searched in advance to build an index of documents. The index contains all of the information necessary for ranking a document based on a search query. When dealing with large numbers of documents, the index may be too large for storage on a single machine. In this situation, the index is split across multiple machines.

To supplement the test set of documents, each search query is sent to each machine that contains a portion of the large document set index. Each machine then uses the search query to rank documents contained in the available portion of the index based on the current values of the document ranking parameters. Based on the document rankings, the documents with the highest ranks are extracted 620 for potential inclusion in the test set. In an embodiment, the number of documents extracted can be 10, 25, 50, 100, 200, or 500. Additionally, any documents in the index that are also in one or more of the truth sets are ranked and extracted.

After extracting documents, each machine contains all of the possible search queries, but only small portion of the potentially matching documents for each search query. In order to determine the best matching documents from the entire index, the results for each search query are assembled on a single machine. To accomplish this, the search queries are distributed among the available machines. Because there are 30,000 truth sets and 500 machines, 60 search queries are distributed to each machine. When a machine receives a search query, the machine also receives all documents extracted based on the search query. At this point, each machine now has one or more search queries (60 in this example) plus documents from all portions of the index which potentially match the search query. For each search query, the rankings for the assembled documents are compared and the top 1000 ranked documents are identified. Once again, any documents included in a truth set are also retained. The combination of documents from the truth sets and the additional top 1000 documents for each search query are used to form 630 the test set of documents.

The full test set of documents is then aggregated on a single master machine. After aggregation, the full test set is copied to each of the 500 machines in preparation for tuning or optimizing of the document feature parameters. A single iteration of optimization begins by dividing the document feature parameters between the machines. Each machine then determines 640 the possible variations in document position for only a single parameter. If there are more document feature parameters than machines, any document feature parameters that give rise to a discontinuity in the ranking equation can be split among multiple machines, with each machine calculating the document position within a single continuous portion of the document feature parameter variation. Each machine then calculates values for document position arrays and parameter gain arrays as described above in order to determine the parameter variation that provides the highest relevance gain and the size of this relevance gain.

The best parameter variations and largest relevance gains are aggregated on the master machine and the largest relevance gain among all parameters is identified 650. This largest gain is used to determine the normalization constant for the remaining relevance gains and the proposed parameter change.

The proposed parameter change is then distributed to multiple machines for identification of a scaling factor. These machines are used to identify the best scaling factor (between 0 and 1 in steps of 0.01) for the proposed parameter change as described above. Note that this embodiment produces 101 proposed parameter changes, so preferably 101 machines would be used to increase the speed of the calculation. The scaling factor leading to the largest relevance gain is also identified 650, and that scaled parameter change is used to update or modify 660 the document feature parameters. The updated feature parameters are passed to all machines to being the next iteration of parameter optimization. The optimization continues until the scaling factor leading to the largest relevance gain is 0, arbitrarily close to zero, or a predetermined number of iterations have been performed.

After converging on an optimized set of document feature parameters, the document ranker is ready for use. When a search query is received 670 by the search engine, such as a search query from a user, the optimized parameters may be used to rank documents 680 in response to a search query received by the search engine and return the ranked listing of documents to the user.

The example of a document search engine has been used as an example of how to optimize the parameters of a pattern recognition engine according to the invention. Those of skill in the art will recognize that the techniques described in connection with the document search engine can be readily applied to other forms of pattern recognition, such as handwriting recognition or automated spell checking and correction. For example, in handwriting recognition, the features could be portions or prototypes of lines used to form characters in an alphabet. For a spell checking application, features could include the length of the word, positional locations of characters, and possibly even context from other surrounding words. This latter feature would allow for grammatical based checking, such as checking for use of plurals and verb tenses.

Having now fully described this invention, it will be appreciated by those skilled in the art that the invention can be performed within a wide range of parameters within what is claimed, without departing from the spirit and scope of the invention.

What is claimed is:

1. A method for performing a document search, comprising:

providing a plurality of documents, each document being associated with at least one search query;

identifying one or more feature parameters for use in a document ranker, each feature parameter having an initial parameter value;

ranking each of the plurality of documents relative to a test set of documents at each of a plurality of parameter variations using said document ranker, wherein each parameter variation comprises a parameter value for an associated feature parameter and the initial parameter value for all other feature parameters;

determining, for each of the plurality of documents, one or more parameter variations that produce a ranking change for a document relative to one or more of the test documents, wherein the determining one or more parameter variations is performed by at least one of one or more computing devices;

aggregating, for each feature parameter, the ranking changes for each of the plurality of documents for each parameter variation associated with the feature parameter, wherein the aggregating the ranking changes is performed by at least one of the one or more computing devices;

identifying, for each feature parameter, a parameter variation corresponding to a maximum relevance value based on the aggregated ranking changes for each of the plurality of documents, wherein the identifying a parameter variation is performed by at least one of the one or more computing devices;

adjusting the parameter values of the plurality of parameters based on the identified parameter variations corresponding to the maximum relevance values, wherein adjusting the parameter values comprises:
  (1) calculating a parameter gain based on the identified parameter variation for each parameter value;
  (2) determining a gain factor for each parameter value corresponding to the calculated parameter gain divided by the largest identified parameter gain; and
  (3) modifying each parameter value by an amount proportional to the gain factor for the parameter value,
  and wherein the adjusting the parameter values is performed by at least one of the one or more computing devices;

receiving a search query; and calculating a ranking value for at least one document using the adjusted parameter value in response to the search query.

2. The method of claim 1, wherein adjusting the parameter values further comprises:
  modifying each parameter value by an amount proportional to a difference between the initial parameter value and the parameter value of the identified parameter variation multiplied by the gain factor for the parameter value.

3. The method of claim 1, wherein aggregating the ranking changes comprising aggregating the ranking changes in a parameter gain array.

4. The method of claim 1, wherein each document associated with a search query is assigned a query value relative to the associated search query.

5. The method of claim 4, further comprising determining, for each parameter variation, a relative value based on a normalized discounted cumulated gain calculation of query values.

6. A method for recognizing a pattern, comprising:
  providing a plurality of patterns, each pattern being associated with at least one pattern query;
  identifying one or more feature parameters for use in a pattern ranker, each feature parameter having an initial parameter value;
  ranking each of the plurality of patterns relative to a test set of patterns for each of a plurality of parameter variations using said pattern ranker, wherein each parameter variation comprises a parameter value for an associated feature parameter and the initial parameter value for all other feature parameters;
  determining, for each of the plurality of patterns, one or more parameter variations that produce a ranking change for a pattern relative to one or more of the test patterns, wherein the determining one or more parameter variations is performed by at least one of one or more computing devices;
  aggregating, for each feature parameter, the ranking changes for each of the plurality of patterns for each parameter variation associated with the feature parameter, wherein the aggregating the ranking changes is performed by at least one of the one or more computing devices;

identifying, for each feature parameter, a parameter variation corresponding to a maximum relevance value based on the aggregated ranking changes for each of the plurality of patterns, wherein the identifying a parameter variation is performed by at least one of the one or more computing devices;

adjusting the parameter values of the plurality of parameters based on the identified parameter variations corresponding to the maximum relevance values, wherein the adjusting the parameter values is performed by at least one of the one or more computing devices;

receiving a pattern query; and calculating a ranking value for at least one pattern using the adjusted parameter values in response to the pattern query.

7. The method of claim 6, wherein adjusting the parameter values comprises modifying each parameter value by an amount proportional to the difference between the current parameter value and the parameter value of the identified parameter variation.

8. The method of claim 6, wherein adjusting the parameter values comprises:
  calculating a parameter gain based on the identified parameter variation for each parameter value;
  determining a gain factor for each parameter value corresponding to the calculated parameter gain divided by the largest identified parameter gain;
  modifying each parameter value by an amount proportional to the gain factor for the parameter value.

9. The method of claim 6, wherein aggregating the ranking changes comprises aggregating the ranking changes in a parameter gain array.

10. The method of claim 6, wherein each pattern associated with a search query is assigned a query value relative to the associated search query, the method further comprising:
  determining, for each parameter variation, a relevance value based on a normalized discounted cumulated gain calculation of query values.

11. The method of claim 6, wherein the plurality of patterns comprise alphanumeric characters and the pattern query comprises a handwriting sample.

12. The method of claim 6, wherein the plurality of patterns comprise strings of characters and the pattern query comprises one or more words in a document being checked for spelling.

13. A system, including a processor, for performing document searches, comprising:
  a document feature evaluator for determining one or more document feature values for a document based on a search query;
  a document ranker for calculating a ranking value based on the one or more document feature values and a feature parameter value associated with each document feature;
  a document ranking aggregator for aggregating document ranking information, identifying variations in feature parameter values corresponding to ranking changes between two or more documents, and determining variations in feature parameter values corresponding to maximum relevance values for a collection of documents; and
  a parameter optimizer for modifying the feature parameter values based on the variations corresponding to maximum relevance values for the collection of documents, wherein the parameter optimizer comprises:

(1) a parameter gain calculator for calculating a parameter gain based on the identified parameter variation for each parameter value;

(2) a gain factor calculator for calculating a gain for each parameter value corresponding to the calculated parameter gain divided by the largest identified parameter gain; and (3) a parameter value modifier for modifying each parameter value by an amount proportional to the gain factor for the parameter value, wherein the parameter optimizer utilizes a computing device to optimize the feature parameters.

14. The system of claim 13, wherein the document ranker further comprises a feature parameter modifier for producing parameter variations.

15. The system of claim 13, wherein each document associated with a search query is assigned a query value relative to the associated search query, and wherein the document ranking aggregator determines variations in feature parameter values that correspond to maximum relevance values based on a discounted cumulated gain calculation of query values.

16. The system of claim 13, wherein the document ranking aggregator further aggregates ranking changes in a parameter gain array.

17. The method of claim 13, wherein the parameter value modifier further modifies each parameter value by an amount proportional to the difference between the current parameter value and the parameter value corresponding to the maximum relevance value.

* * * * *